Sept. 12, 1939. J. M. GWINN, JR., ET AL 2,172,924
FASTENER
Filed July 14, 1937
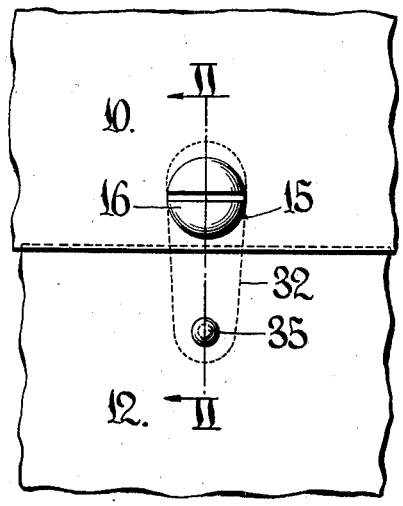
Fig. 1.
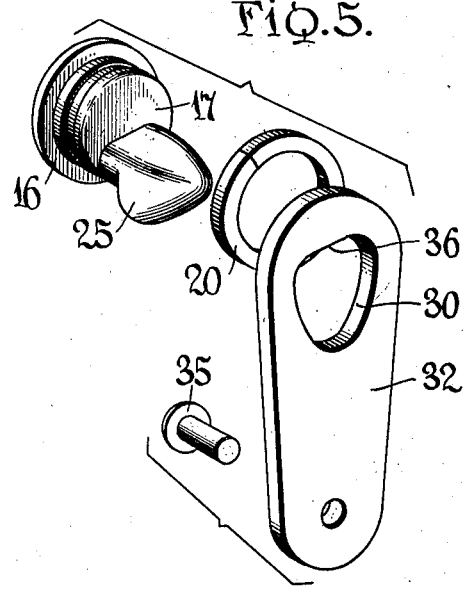
Fig. 5.
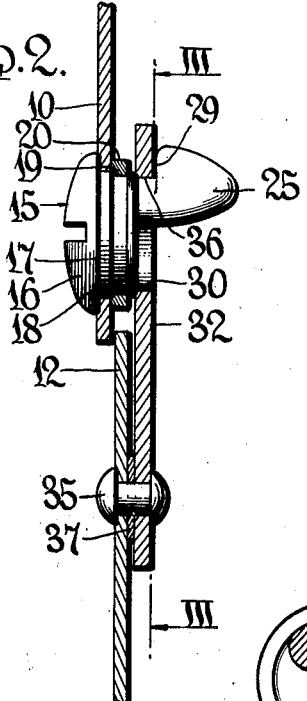
Fig. 2.
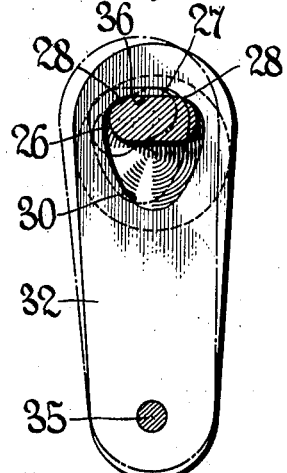
Fig. 3.
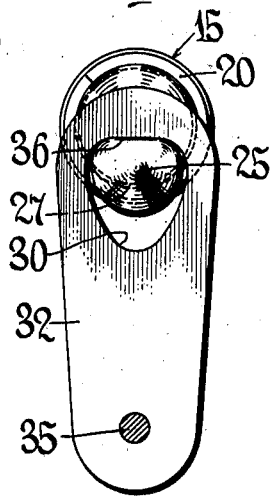
Fig. 4.
Fig. 6.
INVENTORS
Joseph M. Gwinn, Jr.
& Daniel J. Fabricy, Jr.,
BY
Beau, Brooks, Buckley & Beau. ATTORNEYS Patented Sept. 12, 1939

2,172,924

UNITED STATES PATENT OFFICE 2,172,924

FASTENER

Joseph M. Gwinn, Jr., and Daniel J. Fabricy, Jr., Buffalo, N. Y.; said Fabricy assignor to said Gwinn Application July 14, 1937, Serial No. 153,622

10 Claims. (Cl. 292—285)

This invention relates to fasteners, and more particularly to self locking fasteners.

It is desirable in certain types of fasteners to provide means for drawing together the parts to be secured to insure a tight or overlapping assembly. For example, in airplane cowling or automobile engine hoods, or baggage cases, it is desirable to provide a means for drawing the relatively movable parts into alignment and tightly together, and to lock them in position against accidental disengagement. It is usually desirable that fasteners of this type be compact and unobstructive, and particularly in connection with stream line design of airplanes and automobiles it is desirable that the exposed parts of such devices be reduced to minimum dimensions.

It is one object of this invention to provide a simple and compact fastener which is self-locking and effectively resists forces, such as those caused by vibration, tending to loosen or disengage it.

The invention is exemplified in a structure of bolt or stud form adapted for rotatable mounting through a portion of one of the elements to the fastened structure, and provided at its outer end with screw driver slot or other means for convenient movement to adjusted position. An eccentric extension on the inner end of the bolt provides a camming element when the bolt is turned. A hasp, pivotally mounted upon and extending from the element to which the first element is to be fastened, is provided with a recess to receive the eccentric extension in rotatable relation therein.

Stop means are provided on the bolt and on the hasp and are adapted to be brought into abutting relation upon movement of the eccentric beyond a dead center position to prevent accidental displacement of the parts from a fastened position.

In the drawing:

Fig. 1 is a front elevation of a fastener embodying the invention and attached to portions of two relatively movable members;

Fig. 2 is a fragmentary vertical section, on a larger scale, taken substantially along the line II—II of Fig. 1;

Fig. 3 is a vertical section taken substantially along the line III—III of Fig. 2, and illustrating a portion of the fastener in elevation;

Fig. 4 is a rear elevation of the fastening device in an unlocked position;

Fig. 5 is a disassembled perspective of the elements of the fastener, and

Fig. 6 is a rear elevation of an alternative form of stud construction.

In practicing the invention a pair of relatively movable members 10 and 12, such as cowl members of sheet material for airplanes, or the like, are arranged with their edges adjacent each other and are adapted to resist movement toward each other. A bolt or stud 15 of relatively short length is provided with a grooved head 16 and a cylindrical shank 17, the latter of which is rotatably mounted in a bearing opening 18 formed in the member 10. A suitable tool, such as a screw driver, can be applied to the grooved head for rotating the stud.

A portion of the shank 17 opposite the head 16 is provided with an annular groove 19 in which a resilient split ring 20 is mounted for cooperation with the head 16 to prevent the stud from being axially displaced from the opening 18.

An eccentric rigid extension 25 on the inner end of the stud 17 is provided with rounded cam surfaces 26 extending about its side portions and merging with a flattened surface or section 27. The portion of the extension 25 diametrically opposite the flattened surface 27 may also be flattened. Opposite extremities of the flattened surface 27 are defined by a pair of relatively sharply rounded shoulders or high points 28 which merge into the rounded cam surfaces 26. The radial distance from each of these shoulders 28 to the axis of rotation of the stud 17 is greater than the radial distance of any other location on the surfaces 26 and 27. An end portion of the extension is provided with a shoulder 29 formed along one side boundary of the cam shoulders 28 and the flattened surface 27.

The eccentric extension 25 is of such size that it can be inserted through the opening 18 and through the split ring 20, and also can be loosely disposed through a recess 30 formed in the upper or end portion of a hasp 32 which is pivotally connected upon a pin 35 mounted in the lower member 12. An upper horizontal or flattened surface 36 of the hasp defines part of the wall of the recess 30 and rests behind the shoulder 29 to prevent accidental displacement thereof. A suitable spacer 37 positions the hasp in proper alignment with the cam surfaces of the extension 25 and insures proper cooperation between the hasp and eccentric extension.

The term "flattened surface" as used in describing the surfaces 27 and 36 is not intended to be limited to mean a perfectly flat or plane surface, but is intended to include a surface which is slightly rounded or of other form. It is only necessary that the intermediate portions of the surfaces be closer to the center of rotation of the stud 17 than their extremities.

In the loosened position of the elements of the extension 25 and hasp 32, the flattened surface 36 of the hasp rests upon the portion of the extension 25 opposite the surface 27, and upon turning the stud 15 the surface 36 rides upon one of the cam surfaces 26 until it passes over one of the shoulders 28 in approaching a dead center position. In moving from either shoulder 28 into flat contact with the surface 36, the extension 25 permits slight movement of the members 10 and 12 away from each other. During this movement, the hasp 31 is pivotable laterally about its supporting pin 35 to compensate for relative movement of the fastener parts during the adjustment thereof. Conversely, in the dead center position of the hasp with reference to the extension 25, the members 10 and 12 must be drawn slightly closer together in order to ride the surface 36 over either of the shoulders 28. Hence, the hasp surface 36 and the shoulders 28, which serve as stops resist rotation of the stud 15 so long as the members 10 and 12 tend to separate. It is to be understood that the construction specified is particularly designed for the purpose of drawing together elements which have a tendency to separate and automatically maintaining them in a predetermined relative position.

An alternative form of eccentric construction similar to that previously described is shown in Fig. 6 wherein a pair of spaced projections 50 extending from the shank of the stud 17 are in substantially the same relative position as the shoulders 28. Since the remainder of the stud construction is the same as that previously described, the same reference numerals are employed to designate corresponding parts. The operation of the device in which the projections are employed is substantially the same as that described with reference to Figs. 1 to 5.

Although only one form of the invention has been shown and described in detail, it will be apparent to those skilled in the art that the invention is not so limited but that various changes can be made therein without departing from the spirit of the invention or from the scope of the appended claims.

We claim:

1. A connecting device comprising a fastening member having a recess therein, the wall of the fastening member defining said recess having a flattened surface, means for supporting said fastening member, a rotatable member having an eccentric section thereon, said eccentric section having a flattened portion spaced from the axis of rotation of said rotatable member and engageable in face to face relation with the flattened surface at the recess of the fastening member, and means for rotatably supporting said rotatable member.

2. A fastener comprising a hasp having an opening therethrough, the wall of the hasp defining said opening having a flattened section, a stud having a cam portion engageable in said opening and rotatable relative to said hasp to cause relative movement between the hasp and stud, said cam portion having a flattened surface complementary to the flattened section and movable into abutting engagement therewith.

3. A connecting device comprising a pair of fastening members, means supporting the fastening members for relative movement, one of said fastening members having a flattened cam engaging portion, the other fastening member being rotatably supported and provided with a flattened cam section engageable with the cam engaging portion for yieldably maintaining said members in predetermined position and being releasable to permit movement of the members away from each other.

4. A fastener comprising a hasp having an opening therethrough, the wall of the hasp defining said opening having a flattened section, a stud having means for rotatably supporting it about an axis transversely of the hasp, said stud having a pair of surfaces disposed eccentrically at substantially equal distances from the axis of rotation of said stud and engageable in said opening in contact at spaced points with the flattened section of the hasp when the latter is in a dead center and fastened in position with respect to the stud.

5. A fastener comprising a hasp having an opening therethrough, a stud having a cam portion engageable in said opening and rotatable relative to said hasp to cause relative movement between the hasp and the stud in a direction transverse to the axis of rotation of said stud, said cam and said hasp having complementary surfaces adapted to be brought into contiguous relation upon rotation of said stud to a dead center position relative to said hasp, said complementary surfaces having intermediate portions closer to the center of rotation of said stud than their extremities.

6. A fastener comprising a stud provided with an extending eccentric portion, means for rotatably supporting said stud, a hasp provided with an opening to receive said eccentric portion in rotatable relation therein and adapted upon rotation of said stud to be moved relative to said stud in a direction transverse to the axis of rotation thereof, and stop means on said stud and said hasp adapted to co-act upon rotation of said stud beyond a dead center position relative to said hasp to prevent further rotation of said stud away from the dead center position.

7. A fastener comprising a rotatable cam and a hasp engageable with said cam and adapted to be actuated transversely of the axis of rotation of said cam, said cam and hasp having cooperating surfaces thereon including flattened sections arranged to interfit in face to face relation when said hasp is actuated by the cam in one direction transversely of the cam axis to a predetermined position.

8. A connecting device comprising a fastening member having a recess therein, the wall of the fastening member defining said recess having a flattened surface, means for supporting said fastening member, a rotatable member having an eccentric section thereon, said eccentric section having a flattened portion spaced from the axis of rotation of said rotatable member and engageable in face to face relation with the flattened surface at the recess of the fastening member, and means for rotatably supporting said rotatable member, said rotatable member having a radially extending portion adapted to engage said fastening member when said flattened portion and said flattened surface are in face to face relation to prevent relative movement between said fastening member and said rotatable member in a direction parallel to the axis of rotation of the latter.

9. A fastener comprising a hasp having an opening therethrough, the wall of the hasp defining said opening having a flattened section, a stud having a cam portion engageable in said opening and rotatable relative to said hasp to cause relative movement between the hasp and stud, said cam portion having a flattened surface complementary to the flattened section and movable into abutting engagement therewith, and guide means operably associated with said hasp and said stud when said flattened section is in abutting engagement with said flattened surface to prevent relative disengaging movement between said hasp and said stud in a direction parallel to the axis of rotation of said stud.

10. A fastener comprising a stud provided with an extending eccentric portion, means for rotatably supporting said stud, a hasp provided with an opening to receive said eccentric portion in rotatable relation therein and adapted upon rotation of said stud to be moved relative to said stud in a direction transverse to the axis of rotation thereof, and stop means on said stud and said hasp adapted to co-act upon rotation of said stud beyond a dead center position relative to said hasp to prevent further rotation of said stud away from the dead center position, and stop means extending laterally from said stud and adapted to be rotated into abutting engagement with said hasp upon rotation of said stud to dead center position to prevent disengaging relative movement of said stud and said hasp in a direction parallel to the axis of rotation of said stud.

JOSEPH M. GWINN, Jr.
DANIEL J. FABRICY, Jr.